(12) United States Patent
Ralph

(10) Patent No.: US 6,386,635 B1
(45) Date of Patent: May 14, 2002

(54) SHOCK ABSORBING BOAT SEAT ASSEMBLY

(76) Inventor: Gary A. Ralph, 350 Torrey Pines Pt, Naples, FL (US) 34113

( * ) Notice: Subject to any disclaimer, the term of this patent is extended or adjusted under 35 U.S.C. 154(b) by 0 days.

(21) Appl. No.: 09/641,847

(22) Filed: Aug. 18, 2000

(51) Int. Cl.$^7$ ............................................... B60N 2/005
(52) U.S. Cl. ............................ 297/344.1; 297/344.12; 297/344.15; 297/344.18; 297/314
(58) Field of Search ........................ 297/344.1, 344.12, 297/344.18, 314

(56) References Cited

U.S. PATENT DOCUMENTS

| | | | | |
|---|---|---|---|---|
| 1,094,293 A | * | 4/1914 | Banks | 297/314 X |
| 1,398,935 A | * | 11/1921 | Miller | 297/314 X |
| 2,501,976 A | * | 3/1950 | Vitek | 297/344.18 |
| 2,935,120 A | * | 5/1960 | Naus | 297/344.18 X |
| 3,638,896 A | | 2/1972 | Lindstrom | |
| 3,642,088 A | * | 2/1972 | Smith | 297/344.18 X |
| 3,720,443 A | * | 3/1973 | Mourgue | 297/344.15 X |
| 3,758,064 A | | 9/1973 | Sawaki | |
| 3,856,252 A | * | 12/1974 | Regis | 297/344.18 X |
| 3,885,764 A | * | 5/1975 | Pabreza | 297/344.15 X |
| 4,254,991 A | | 3/1981 | Venieris | |
| 4,315,613 A | * | 2/1982 | Godwin et al. | 297/344.12 X |
| 4,440,372 A | * | 4/1984 | Wisniewski | 297/344.12 X |
| 4,493,469 A | * | 1/1985 | Holobaugh | 297/344.12 X |
| D282,028 S | | 1/1986 | Kennedy | |
| 4,598,892 A | * | 7/1986 | Franckowiak et al. | 297/344.18 X |
| 4,613,106 A | * | 9/1986 | Tornero | 297/344.18 X |
| 4,809,944 A | | 3/1989 | Smith et al. | |
| 4,860,987 A | * | 8/1989 | Werner | 297/344.18 X |
| 4,872,635 A | * | 10/1989 | Knoblock et al. | 297/344.18 X |
| 4,884,842 A | * | 12/1989 | Finkelstein | 297/344.18 X |
| 5,044,299 A | * | 9/1991 | Frank | 297/344.18 X |
| 5,524,967 A | * | 6/1996 | Glockl | 297/314 |
| 5,639,059 A | | 6/1997 | Nash | |
| 5,909,925 A | * | 6/1999 | Glockl | 297/314 |
| 5,911,191 A | * | 6/1999 | Burer | 297/344.18 X |
| 5,921,628 A | * | 7/1999 | Glockl | 297/344.18 X |
| 6,003,944 A | * | 12/1999 | Glockl | 297/314 X |
| 6,206,335 B1 | * | 3/2001 | Huber et al. | 297/314 X |

FOREIGN PATENT DOCUMENTS

| | | | | |
|---|---|---|---|---|
| CH | 1162635 | * | 6/1985 | 297/344.12 |
| DE | 2406338 | * | 8/1975 | 297/344.18 |

* cited by examiner

Primary Examiner—Peter M. Cuomo
Assistant Examiner—Rodney B. White

(57) ABSTRACT

A shock absorbing boat seat assembly for providing a more comfortable ride upon a boat moving upon water. The shock absorbing boat seat assembly includes one or more seat members each having a seat and a backrest connected to the seat; and also includes one or more base assemblies for supporting one or more seat members with each of one or more base assemblies having a base member being adapted to securely mount upon a deck of a boat, and also having a boss-like support member securely disposed upon the base member and having a opening therein, and further having a hollow tubular member being movably disposed in the opening of the boss-like support member, and also having a shock absorbing assembly for absorbing shock, and further having a seat support member securely mounted upon the tubular member.

10 Claims, 5 Drawing Sheets

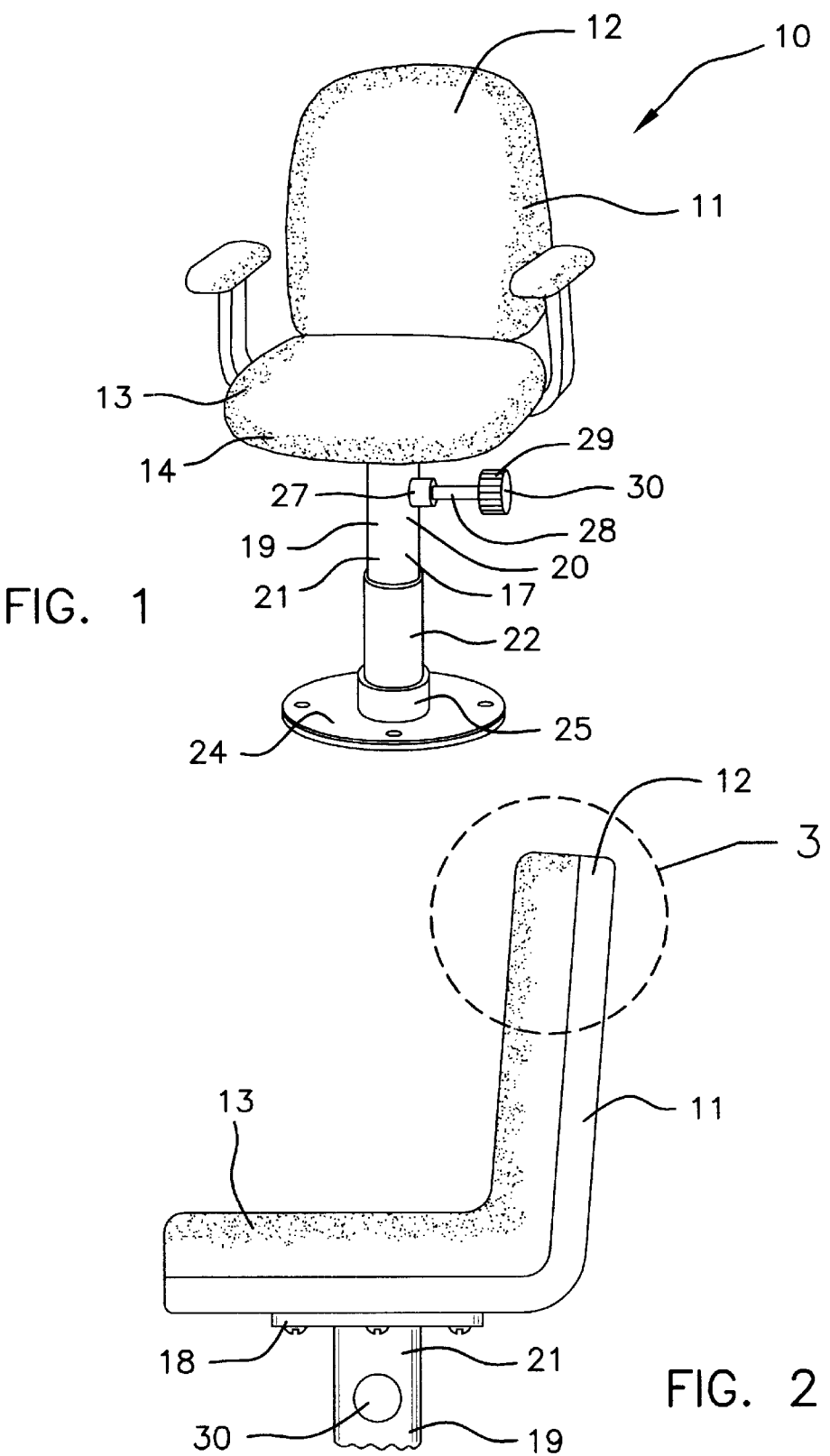

SHOCK ABSORBING BOAT SEAT ASSEMBLY

BACKGROUND OF THE INVENTION

1. Field of the Invention

The present invention relates to a wave absorbing boat seat and more particularly pertains to a new shock absorbing boat seat assembly for providing a more comfortable ride upon a boat moving upon water.

2. Description of the Prior Art

The use of a wave absorbing boat seat is known in the prior art. More specifically, a wave absorbing boat seat heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,639,059; U.S. Pat. No. 4,254,991; U.S. Pat. No. 3,638,896; U.S. Pat. No. 3,758,064; U.S. Pat. No. 4,809,944; and U.S. Pat. No. Des. 282,028.

While these devices fulfill their respective, particular objectives and requirements, the aforementioned patents do not disclose a new shock absorbing boat seat assembly. The inventive device includes one or more seat members each having a seat and a backrest connected to the seat; and also includes one or more base assemblies for supporting one or more seat members with each of one or more base assemblies having a base member being adapted to securely mount upon a deck of a boat, and also having a boss-like support member securely disposed upon the base member and having a opening therein, and further having a hollow tubular member being movably disposed in the opening of the boss-like support member, and also having a shock absorbing assembly for absorbing shock, and further having a seat support member securely mounted upon the tubular member.

In these respects, the shock absorbing boat seat assembly according to the present invention substantially departs from the conventional concepts and designs of the prior art, and in so doing provides an apparatus primarily developed for the purpose of providing a more comfortable ride upon a boat moving upon water.

SUMMARY OF THE INVENTION

In view of the foregoing disadvantages inherent in the known types of wave absorbing boat seat now present in the prior art, the present invention provides a new shock absorbing boat seat assembly construction wherein the same can be utilized for providing a more comfortable ride upon a boat moving upon water.

The general purpose of the present invention, which will be described subsequently in greater detail, is to provide a new shock absorbing boat seat assembly which has many of the advantages of the wave absorbing boat seat mentioned heretofore and many novel features that result in a new shock absorbing boat seat assembly which is not anticipated, rendered obvious, suggested, or even implied by any of the prior art wave absorbing boat seat, either alone or in any combination thereof.

To attain this, the present invention generally comprises one or more seat members each having a seat and a backrest connected to the seat; and also includes one or more base assemblies for supporting one or more seat members with each of one or more base assemblies having a base member being adapted to securely mount upon a deck of a boat, and also having a boss-like support member securely disposed upon the base member and having a opening therein, and further having a hollow tubular member being movably disposed in the opening of the boss-like support member, and also having a shock absorbing assembly for absorbing shock, and further having a seat support member securely mounted upon the tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shock absorbing boat seat assembly which has many of the advantages of the wave absorbing boat seat mentioned heretofore and many novel features that result in a new shock absorbing boat seat assembly which is not anticipated, rendered obvious, suggested, or even implied by any of the prior art wave absorbing boat seat, either alone or in any combination thereof.

It is another object of the present invention to provide a new shock absorbing boat seat assembly which may be easily and efficiently manufactured and marketed.

It is a further object of the present invention to provide a new shock absorbing boat seat assembly which is of a durable and reliable construction.

An even further object of the present invention is to provide a new shock absorbing boat seat assembly which is susceptible of a low cost of manufacture with regard to both materials and labor, and which accordingly is then susceptible of low prices of sale to the consuming public, thereby making such shock absorbing boat seat assembly economically available to the buying public.

Still yet another object of the present invention is to provide a new shock absorbing boat seat assembly which provides in the apparatuses and methods of the prior art some of the advantages thereof, while simultaneously overcoming some of the disadvantages normally associated therewith.

Still another object of the present invention is to provide a new shock absorbing boat seat assembly for providing a more comfortable ride upon a boat moving upon water.

Yet another object of the present invention is to provide a new shock absorbing boat seat assembly which includes one or more seat members each having a seat and a backrest connected to the seat; and also includes one or more base assemblies for supporting one or more seat members with each of one or more base assemblies having a base member being adapted to securely mount upon a deck of a boat, and also having a boss-like support member securely disposed upon the base member and having a opening therein, and further having a hollow tubular member being movably disposed in the opening of the boss-like support member, and also having a shock absorbing assembly for absorbing shock, and further having a seat support member securely mounted upon the tubular member.

Still yet another object of the present invention is to provide a new shock absorbing boat seat assembly that prevents back pain and fatigue.

Even still another object of the present invention is to 15 provide a new shock absorbing boat seat assembly that provides the boater with a stable and comfortable ride.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new shock absorbing boat seat assembly according to the present invention.

FIG. 2 is a side elevational view of the present invention.

DESCRIPTION OF THE PREFERRED EMBODIMENT

Figure 3:
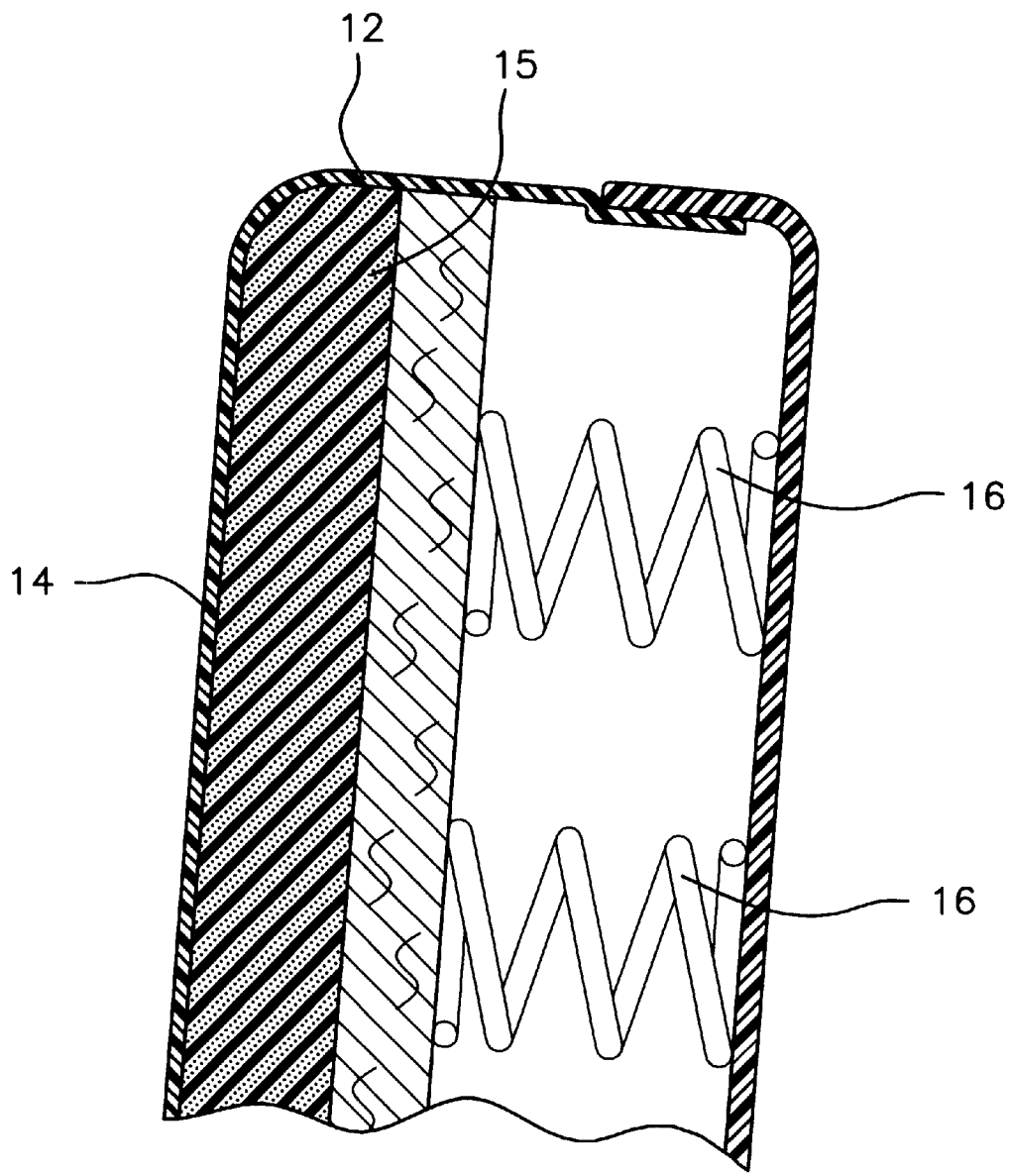
FIG. 3 is a cross-sectional view of the backrest of the present invention.
Figure 4:
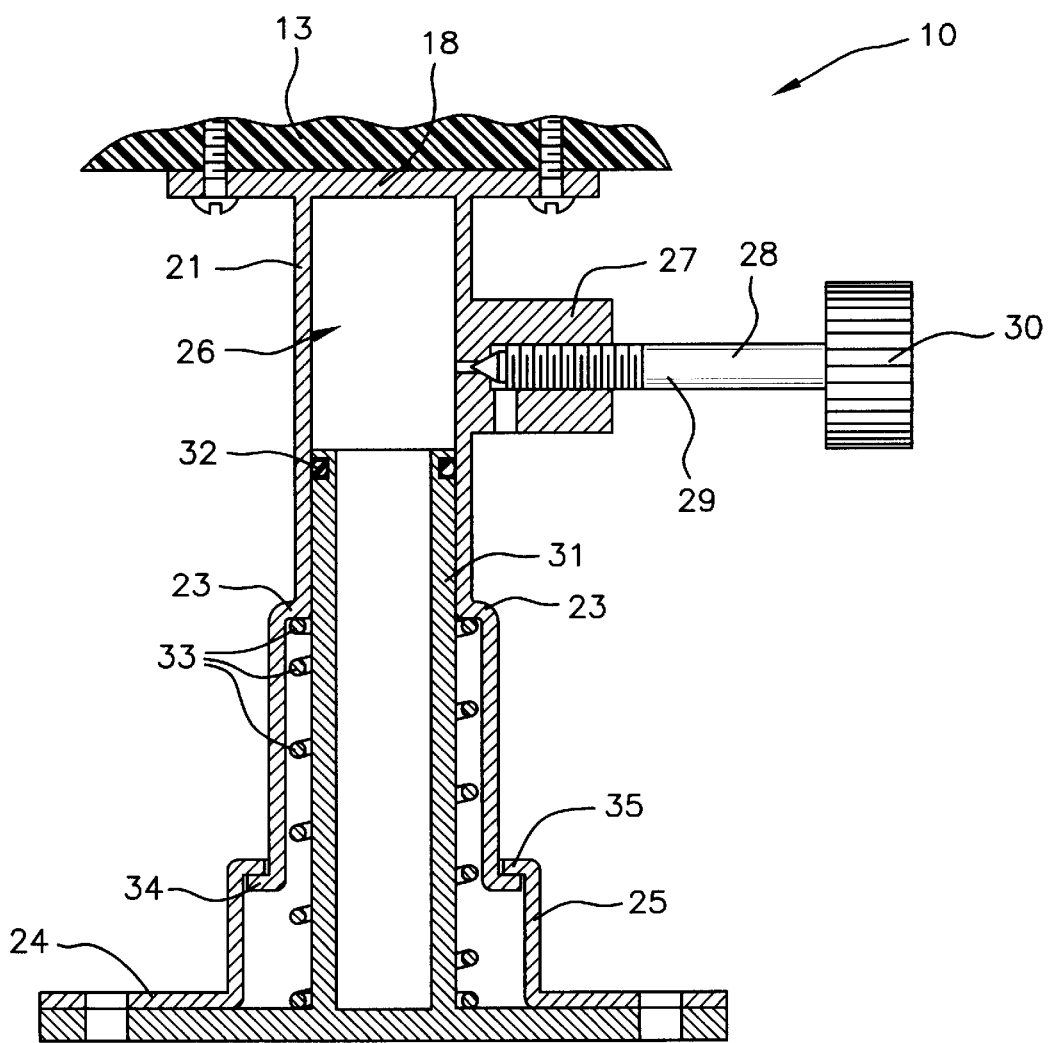
FIG. 4 is a cross-sectional view of base assembly of the present invention.
Figure 5:
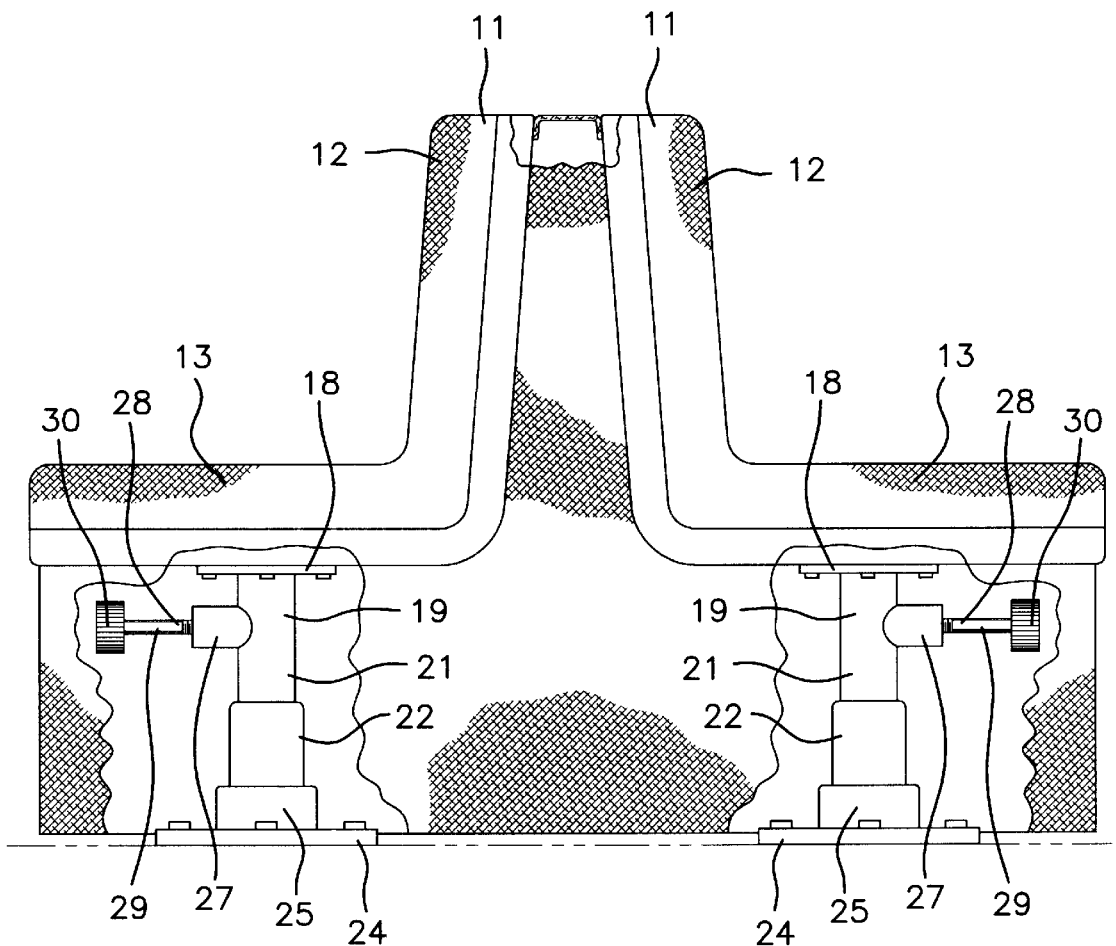
FIG. 5 is a side elevational view of the second embodiment of the present invention.
Figure 6:
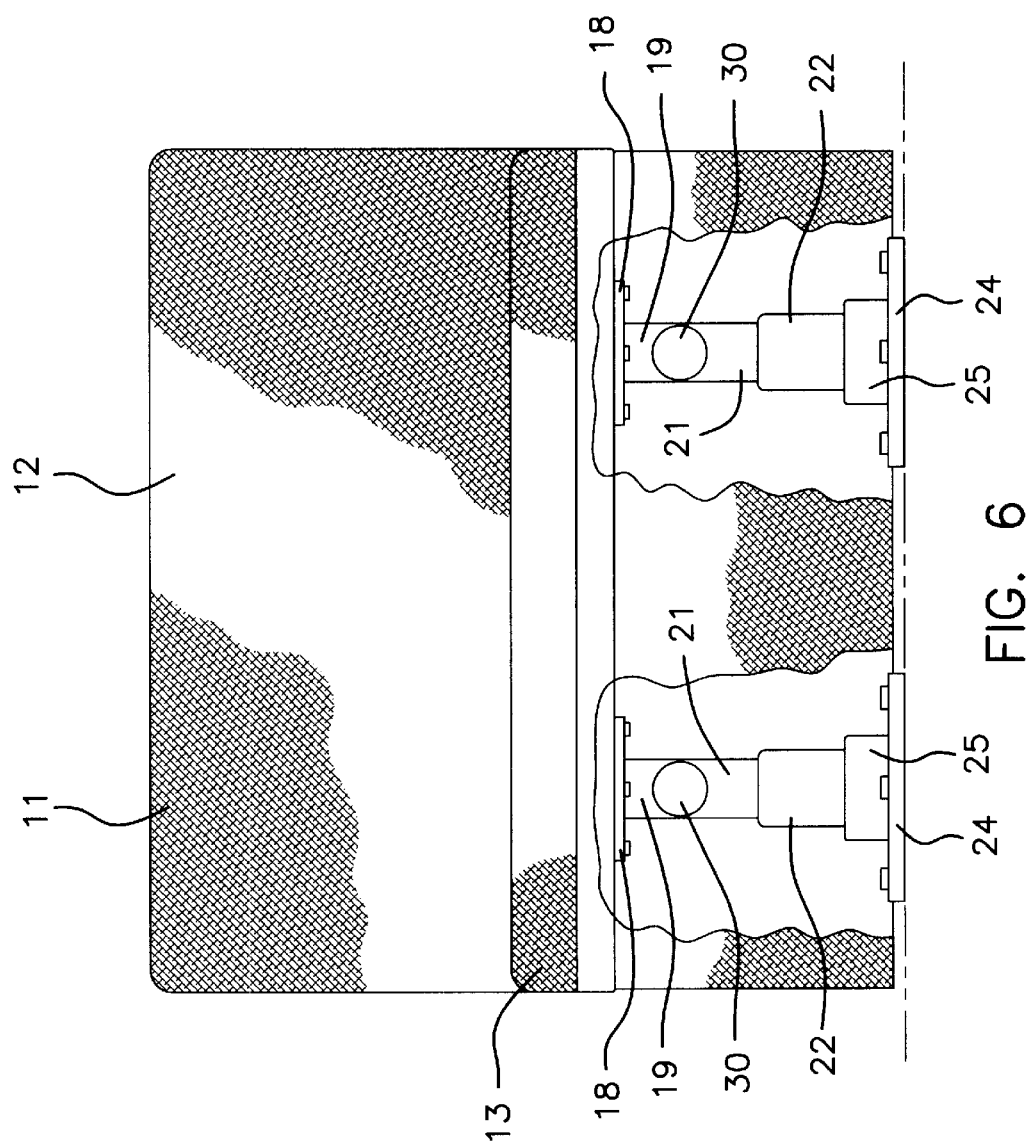
FIG. 6 is front elevational view of the second embodiment of present invention.

With reference now to the drawings, and in particular to FIGS. 1 through 6 thereof, a new shock absorbing boat seat assembly embodying the principles and concepts of the present invention and generally designated by the reference numeral 10 will be described.

As best illustrated in FIGS. 1 through 6, the shock absorbing boat seat assembly 10 generally comprises one or more seat members 11 each having a seat 13 and a backrest 12 conventionally connected to the seat 13. Each backrest 12 and seat 13 of each seat member 11 includes a padded member 15, spring members 16 and a cover 14 conventionally enclosing the padded member 15 and the spring members 16.

The shock absorbing boat seat assembly 10 also includes one or more base assemblies 17 for supporting the one or more seat members 11 with each of the one or more base assemblies 17 having a base member 24 being adapted to securely and conventionally mount upon a deck of a boat, and also having a boss-like support member 25 being securely and conventionally disposed upon the base member 24 and having a opening therein, and further having a hollow tubular member 19 being movably disposed in the opening of the boss-like support member 25, and also having a means for absorbing shock, and further having a seat support member 18 securely and conventionally mounted upon the tubular member 19. The means for absorbing shock includes a shaft 31 securely and sealingly disposed in the tubular member 19 with a seal member 32, and also includes compressed air 26 disposed in the tubular member 19, and further includes a valve body 27 conventionally disposed in a side wall 20 of the tubular member 19, and also includes a valve member 28 adjustably and conventionally disposed in the valve body 27 for controlling an amount of pressure of the compressed air 26 in the hollow tubular member 19, and further includes a spring 33 mounted about the shaft 31 and biasing the tubular member 19 upwardly relative to the base member 24. The valve member 28 includes a stem 29 and a knob 30 securely attached to an end of the stem 29 with the stem 29 being movably disposed in the valve body 27 for controlling the pressure of the compressed air 26 in the tubular member 19. The tubular member 19 includes a lower portion 22 and an upper portion 21 with the lower portion 22 having a larger circumference than that of the upper portion 21 thus forming an inverted ledge 23 at a juncture of the upper and lower portions 21,22. The compressed air 26 is essentially disposed in the upper portion 21 of the tubular member 19 above the shaft 31 with the spring 33 being disposed between the base member 24 and the inverted ledge 23 of the tubular member 19. The tubular member 19 further includes an annular flange 34 securely and integrally disposed about an exterior of the wall 20 of the lower portion 22 at a bottom end thereof for retaining the tubular member 19 in the boss-like support member 25. The boss-like support member 25 includes an inwardly-turned rim 35 integrally disposed at a top thereof for retaining the annular flange 34 of the tubular member 19 in the boss-like support member 25.

As a second embodiment, the one or more seat members 11 includes two seat members 11 which are essentially disposed back to back, and the one or more base assemblies 17 includes two base assemblies 17 each supporting a respective seat member 11.

In use, the user sits upon the boat seat assembly 10 and as the boat moves upon the water the base assembly 17 essentially absorbs the shock caused by the boat bouncing upon the waves of the water since the seat member 11 is allowed to move relative to the base assembly 17.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shock absorbing boat seat assembly comprising:

one or more seat members each having a seat and a backrest connected to said seat; and one or more base assemblies for supporting said one or more seat members with each of said one or more base assemblies having a base member being adapted to mount upon a deck of a boat, and also having a support member disposed upon said base member and having a opening therein, and further having a hollow tubular member being movably disposed in said opening of said support member, and also having a means for absorbing shock, and further having a seat support member mounted upon said tubular member;

wherein said means for absorbing shock includes a shaft disposed in said tubular member with a seal member, and also includes compressed air disposed in said tubular member, and further includes a valve body disposed in a side wall of said tubular member, and also includes a valve member adjustably disposed in said valve body for controlling an amount of pressure of said compressed air in said hollow tubular member, and further includes a spring mounted about said shaft and biasing said tubular member upwardly relative to said base member.

2. A shock absorbing boat seat assembly as described in claim 1, wherein said valve member includes a stem and a knob attached to an end of said stem with said stem being movably disposed in said valve body.

3. A shock absorbing boat seat assembly as described in claim 1, wherein said tubular member includes a lower portion and an upper portion, said lower portion having a larger circumference than that of said upper portion thus forming an inverted ledge at a juncture of said upper and lower portions.

4. A shock absorbing boat seat assembly as described in claim 3, wherein said spring is disposed between said base member and said inverted ledge of said tubular member.

5. A shock absorbing boat seat assembly as described in claim 3, wherein said tubular member includes an annular flange disposed about an exterior of said wall of said lower portion at a bottom end thereof for retaining said tubular member is said support member.

6. A shock absorbing boat seat assembly as described in claim 1, wherein said compressed air is disposed in said upper portion of said tubular member above said shaft.

7. A shock absorbing boat seat assembly as described in claim 1, wherein said support member includes an inwardly-turned rim disposed at a top thereof for retaining said annular flange of said tubular member in said support member.

8. A shock absorbing boat seat assembly as described in claim 1, wherein each said backrest and seat of each said seat member includes a padded member, spring members and a cover enclosing said padded member and said spring members.

9. A shock absorbing boat seat assembly as described in claim 1, wherein said one or more seat members includes two seat members which are disposed back to back, and said one or more base assemblies includes two base assemblies each supporting a respective said seat member.

10. A shock absorbing boat seat assembly comprising:

one or more seat members each having a seat and a backrest connected to said seat, each said backrest and seat of each said seat member including a padded member, spring members and a cover enclosing said padded member and said spring members; and one or more base assemblies for supporting said one or more seat members with each of said one or more base assemblies having a base member being adapted to securely mount upon a deck of a boat, and also having a support member securely disposed upon said base member and having a opening therein, and further having a hollow tubular member being movably disposed in said opening of said support member, and also having a means for absorbing shock, and further having a seat support member securely mounted upon said tubular member, said means for absorbing shock including a shaft securely and sealingly disposed in said tubular member with a seal member, and also including compressed air disposed in said tubular member, and further including a valve body disposed in a side wall of said tubular member, and also including a valve member adjustably disposed in said valve body for controlling an amount of pressure of said compressed air in said hollow tubular member, and further including a spring mounted about said shaft and biasing said tubular member upwardly relative to said base member, said valve member including a stem and a knob securely attached to an end of said stem with said stem being movably disposed in said valve body, said tubular member including a lower portion and an upper portion, said lower portion having a larger circumference than that of said upper portion thus forming an inverted ledge at a juncture of said upper and lower portions, said compressed air being essentially disposed in said upper portion of said tubular member above said shaft, said spring being disposed between said base member and said inverted ledge of said tubular member, said tubular member including an annular flange securely disposed about an exterior of said wall of said lower portion at a bottom end thereof for retaining said tubular member in said support member, said support member including an inwardly-turned rim disposed at a top thereof for retaining said annular flange of said tubular member in said support member.

* * * * *